(12) United States Patent
Avagyan et al.

(10) Patent No.: US 11,703,350 B2
(45) Date of Patent: Jul. 18, 2023

(54) SYSTEM AND METHOD FOR AUTOMATICALLY ANNOTATING A MAP

(71) Applicant: Fetch Robotics, Inc., San Jose, CA (US)

(72) Inventors: Levon Avagyan, San Jose, CA (US); Jiahao Feng, Castro Valley, CA (US); Alex Henning, Norwelll, MA (US); Michael Ferguson, Concord, NH (US); Melonee Wise, San Jose, CA (US); Derek King, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 258 days.

(21) Appl. No.: 17/075,667

(22) Filed: Oct. 20, 2020

(65) Prior Publication Data

US 2021/0034810 A1    Feb. 4, 2021

Related U.S. Application Data

(62) Division of application No. 16/380,867, filed on Apr. 10, 2019, now Pat. No. 10,853,561.

(60) Provisional application No. 62/655,744, filed on Apr. 10, 2018, provisional application No. 62/655,755, filed on Apr. 10, 2018.

(51) Int. Cl.
*G01C 21/00* (2006.01)
*G06F 40/169* (2020.01)
*G06T 11/20* (2006.01)
*G01C 21/32* (2006.01)
*G06V 20/58* (2022.01)
*G06V 20/10* (2022.01)

(52) U.S. Cl.
CPC ......... *G01C 21/3848* (2020.08); *G01C 21/32* (2013.01); *G06F 40/169* (2020.01); *G06T 11/20* (2013.01); *G06V 20/10* (2022.01); *G06V 20/58* (2022.01)

(58) Field of Classification Search
None
See application file for complete search history.

(56) References Cited

U.S. PATENT DOCUMENTS

2016/0086052 A1* 3/2016 Piekniewski .......... G06V 10/50
                                                             382/103
2016/0180195 A1* 6/2016 Martinson .............. G06K 9/628
                                                             382/103
2019/0094858 A1* 3/2019 Radosavljevic ......... G08G 1/14
2019/0310378 A1* 10/2019 Ho .......................... G06T 7/187

* cited by examiner

*Primary Examiner* — Leon Viet Q Nguyen

(57) ABSTRACT

A system for automatically annotating a map includes: a robot; a server operably connected to the robot; file storage configured to store files, the file storage operably connected to the server; an annotations database operably connected to the server, the annotations database comprising map annotations; an automatic map annotation service operably connected to the server, the automatic map annotation service configured to automatically do one or more of create a map of an item of interest and annotate a map of an item of interest; a queue of annotation requests operably connected to the automatic annotation service; and a computer operably connected to the server, the computer comprising a graphic user interface (GUI) usable by a human user.

4 Claims, 17 Drawing Sheets

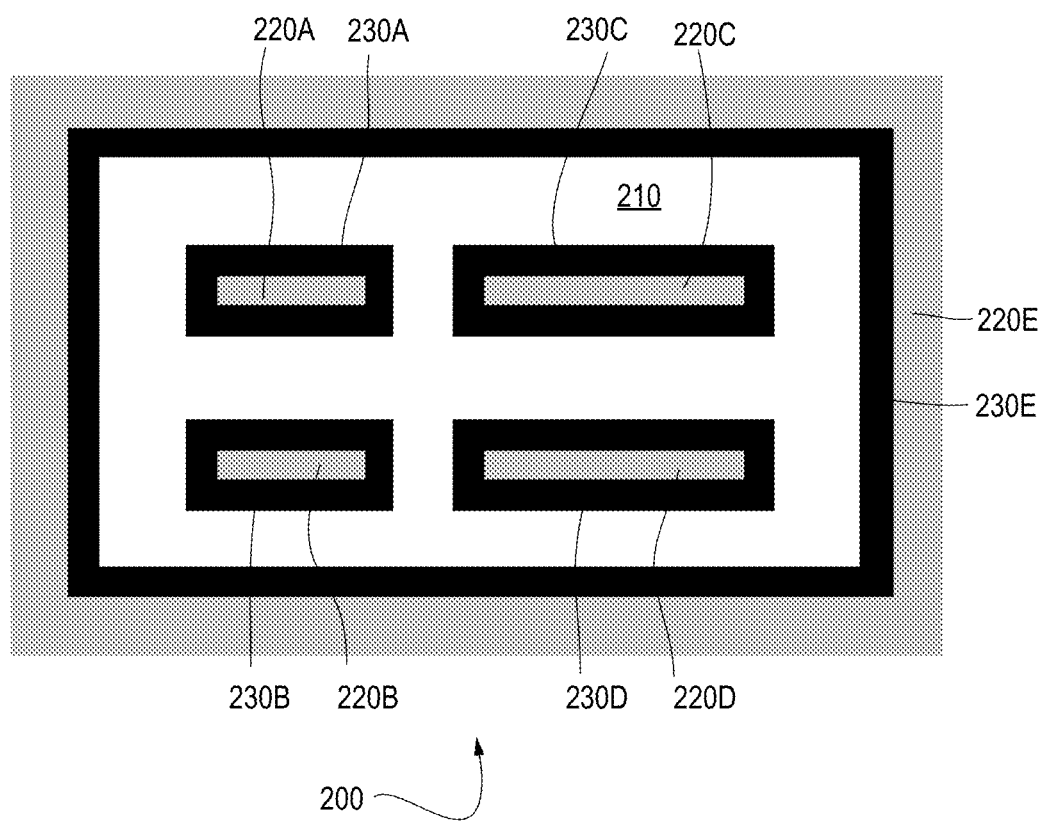

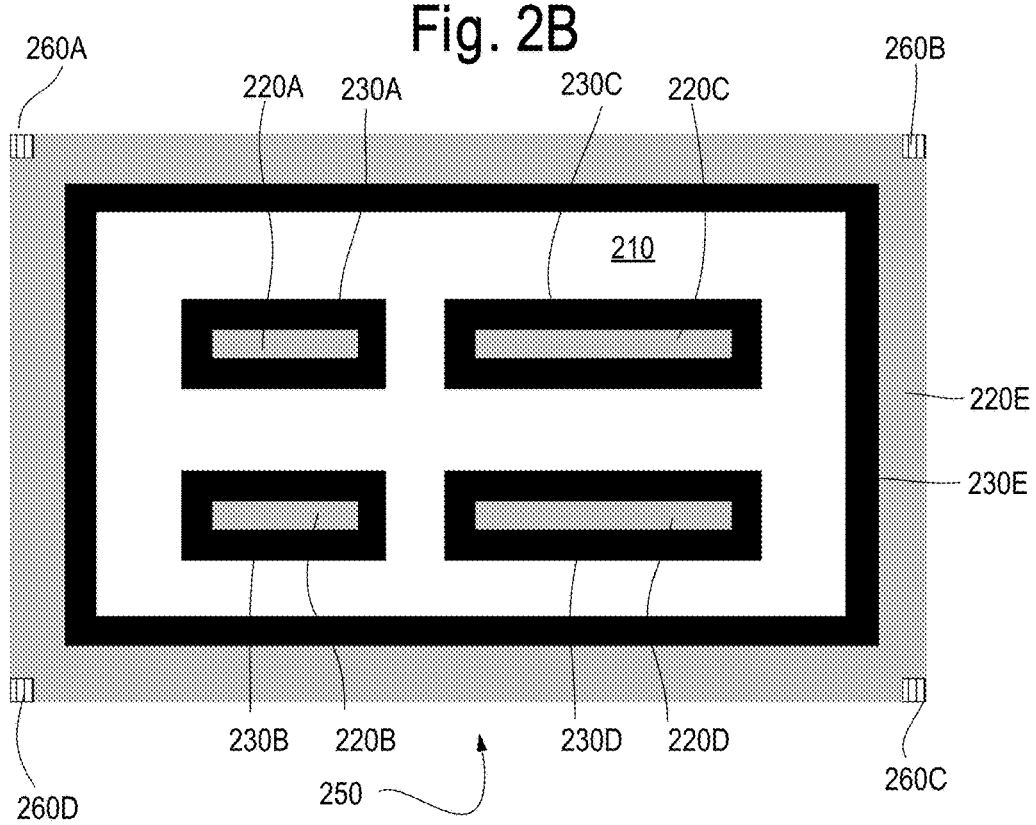
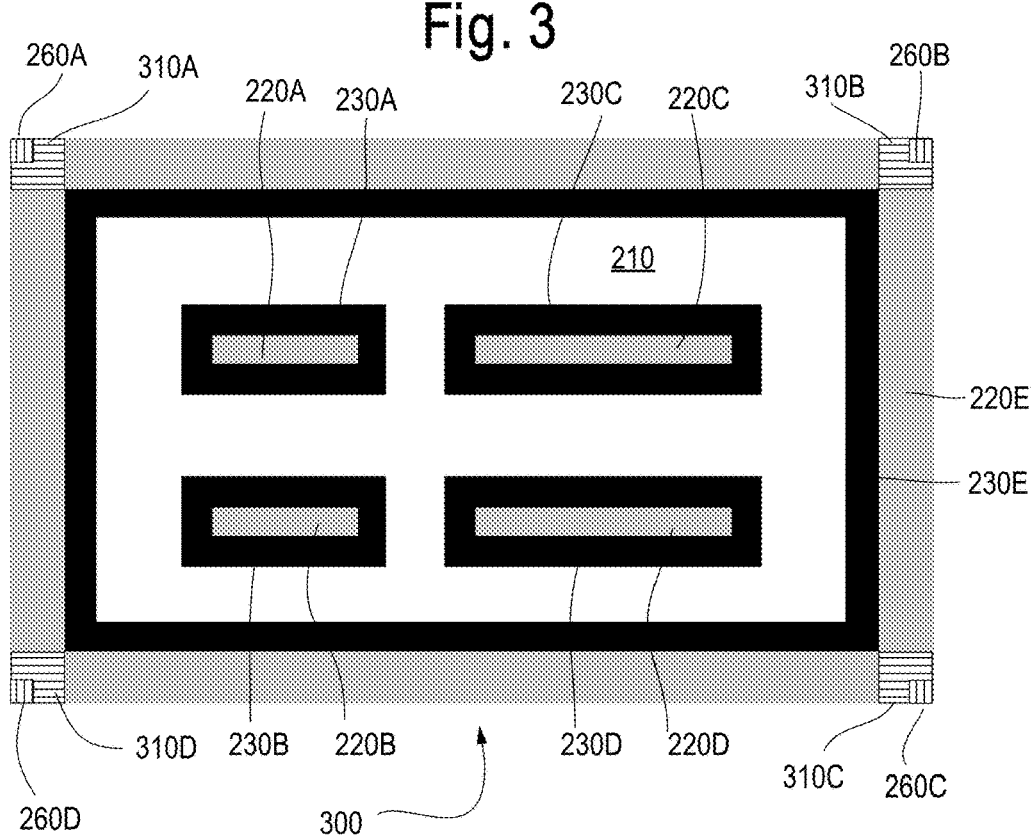

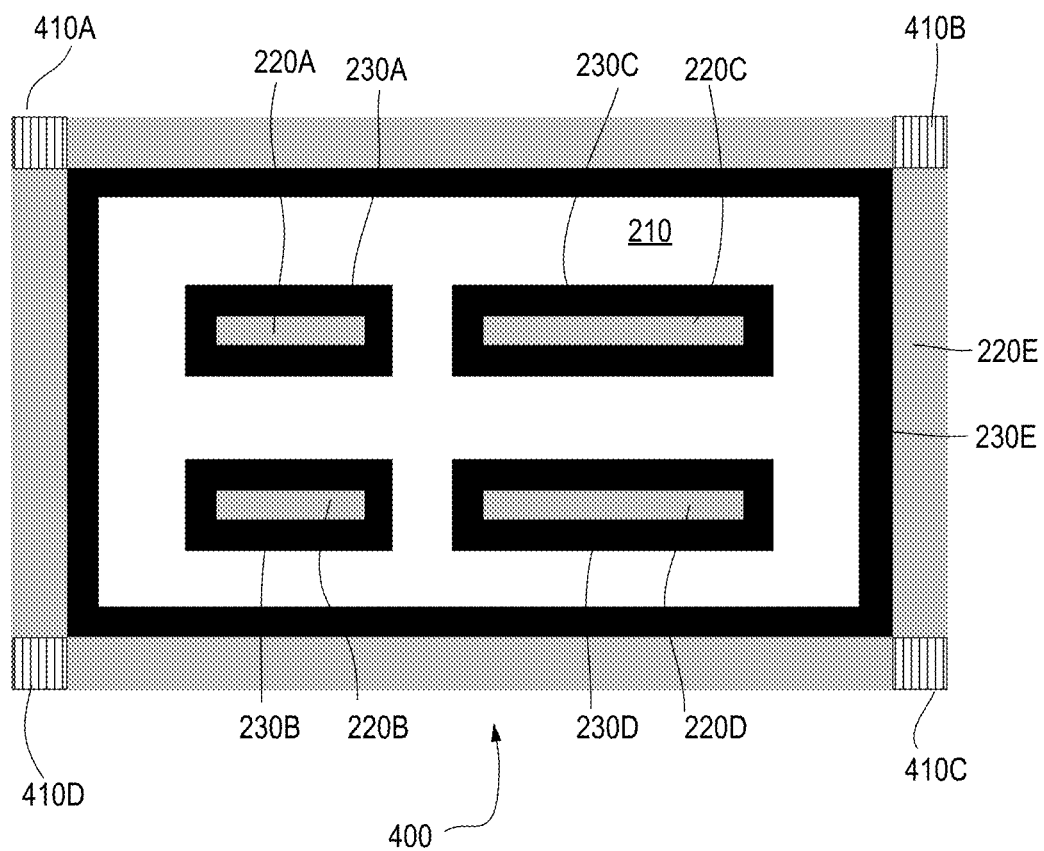

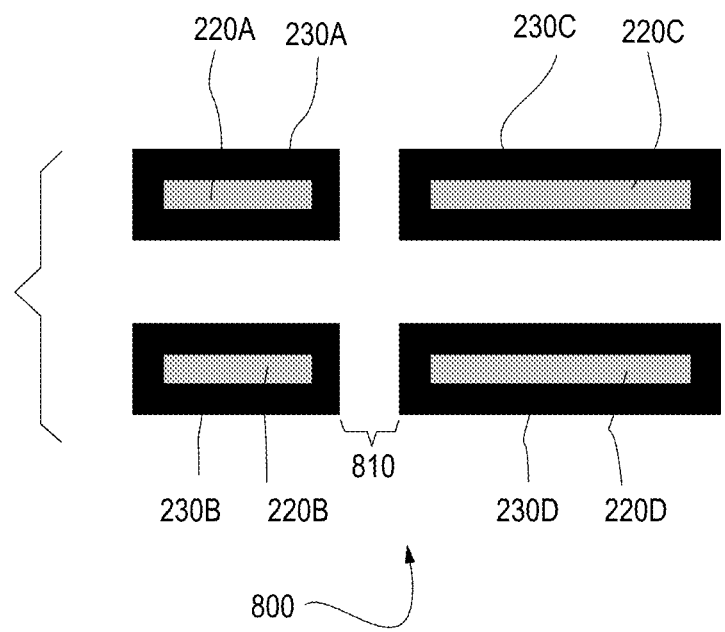
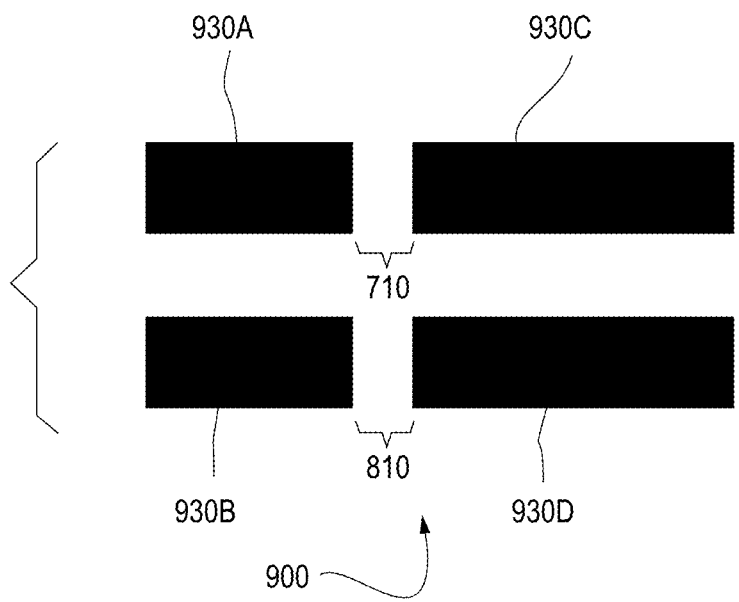

SYSTEM AND METHOD FOR AUTOMATICALLY ANNOTATING A MAP

PRIORITY CLAIM

The present application claims the priority benefit of U.S. provisional patent application No. 62/655,744 filed Apr. 10, 2018 and entitled "Graphic User Interface and Software for Robotic Management," and of U.S. provisional patent application No. 62/655,755 filed Apr. 10, 2018 and entitled "System and Method for Automatically Annotating a Map," the disclosures of which are incorporated herein by reference.

CROSS-REFERENCE TO RELATED APPLICATIONS

This application contains subject matter that is related to the subject matter of the following applications, which are assigned to the same assignee as this application. The below-listed applications are hereby incorporated herein by reference in its entirety:

"ROBOT MANAGEMENT SYSTEM," by Dymesich, et al., co-filed herewith.

"SYSTEM AND METHOD FOR ROBOT-ASSISTED, CART-BASED WORKFLOWS," by Cairl, et al., co-filed herewith.

"ROBOTIC CART CONFIGURED FOR EFFECTIVE NAVIGATION AND MULTI-ORIENTATION DOCKING," by Diehr, et al., co-filed herewith.

SUMMARY

Embodiments of this invention relate in general to a system and method for automatically annotating a map. More specifically, embodiments of this invention relate to a system and method for automatically annotating a map to be used by one or more of a robot, a self-driving automobile, and another autonomous agent.

A system for automatically annotating a map includes: a robot; a server operably connected to the robot; file storage configured to store files, the file storage operably connected to the server; an annotations database operably connected to the server, the annotations database comprising map annotations; an automatic map annotation service operably connected to the server, the automatic map annotation service configured to automatically do one or more of create a map of an item of interest and annotate a map of an item of interest; a queue of annotation requests operably connected to the automatic annotation service; and a computer operably connected to the server, the computer comprising a graphic user interface (GUI) usable by a human user.

A method for automatically annotating a robotic map, comprising: setting frontier corners of the map to a frontier marking; performing a first flood fill near each of the corners of the map, using the corners as seeds for the first flood fill; setting neighbor pixels to a frontier marking, creating expanded frontier corners; performing a second flood fill near each of the expanded frontier corners, using the expanded frontier corners as seeds for the second flood fill; setting expanded neighbor pixels to a frontier marking, creating further expanded frontier regions; repeating the steps of performing the second flood fill and setting the expanded neighbor pixels until all unobserved pixels have been set to the frontier marking and no more neighboring frontier pixels remain; dilating the frontier pixels by one pixel; repeating the dilating step a number of times equal to a number of pixels in a frontier bridge increment; converting all frontier pixels to free space; converting remaining unobserved pixels to obstacle pixels; dilating obstacle pixels by an obstacle bridge increment; eroding obstacle pixels by the obstacle bridge increment; identifying a obstacle pixel as a seed pixel not part of an obstacle group; using the seed pixel to create a new connected group comprising a set of contiguous obstacle pixels that are contiguous to the seed pixel; adding the contiguous obstacle pixels to the seed pixel, creating a larger obstacle group; repeating the steps of identifying the obstacle pixel, creating the new connected group, and adding the contiguous obstacle pixels until all pixels connected by obstacle pixels to the original seed pixel are added to create finished obstacle groups; creating convex hulls for the finished obstacle groups; and displaying the final map.

A method for automatically annotating a robotic map, comprising: performing a flood fill to dilate all exterior gray pixels to perform a removal of an exterior wall; smoothing the entire map; performing edge detection on the entire map to find edges in the map; performing a nearest neighbor clustering technique to identify clusters; creating a convex hull for the clusters; and displaying the final map.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 2A-2B are a set of two maps illustrating a first method for automatically annotating a map.

FIG. 3 shows a resulting map after, according to the first method for automatically annotating a map, the system performs a first flood fill near each of the corners.

FIG. 4 shows a resulting map after, according to the first method for automatically annotating a map, the system sets the neighbor pixels to a frontier marking.

FIG. 8 shows a resulting map after, according to the first method for automatically annotating a map, all frontier pixels are converted to free space, indicated by a white color.

FIG. 9 shows a resulting map after, according to the first method for automatically annotating a map, all remaining unobserved pixels are converted to obstacle pixels, indicated by a black color.

DETAILED DESCRIPTION

Figure 1:
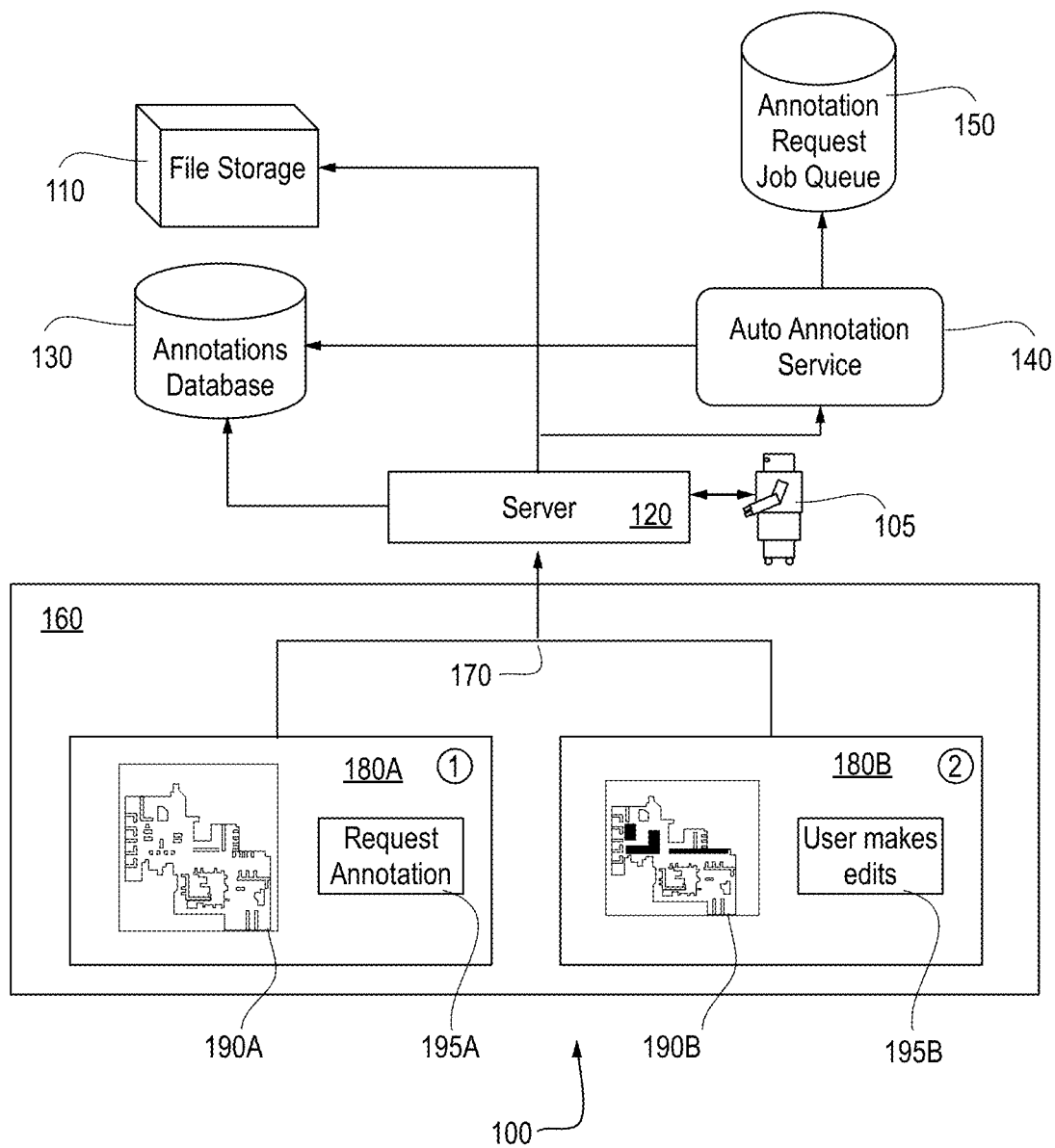
FIG. 1 is a system diagram for a system 100 for automatically annotating a map.

A method for automatically annotating a map includes: determining, from sensor data sensed in an environment, an item of interest within the environment; finding a correlation between the item of interest in a map of the environment.

Embodiments of the invention relate in general to a system and method for automatically annotating a map.

Embodiments of the invention relate to a system and method for automatically annotating a keepout zone in a map. A keepout zone is a map region from which robots are excluded. For example, robots are excluded from a keepout zone to promote robot safety. For example, robots are excluded from a keepout zone for a reason other than robot safety. A system and method for automatically annotating a keepout zone in a map can automatically annotate a region from which it is desired by one or more of a user and the system to exclude a robot.

According to embodiments of the invention, a system for automatically annotating a map comprises a server and a robot. For example, the server comprises a computer. For example, the server comprises a map storage server configured to store a map. The map storage server comprises one or more of the map, annotations of the map, and metadata describing the map. Preferably, though not necessarily, the map storage server comprises the map, the annotations of the map, and the metadata describing the map.

The robot comprises one or more of a sensor and a robotic computer. Preferably, though not necessarily, the robot comprises the sensor and the robotic computer. For example, the sensor is configured to detect data. For example, the sensor comprises a laser sensor. For example, the sensor comprises a sensor package. For example, the robotic computer is configured to find an item of interest in the data detected by the sensor.

The server can be located in a variety of places. For example, the server may be located within or adjacent to the environment in which one or more robots operate. For example, the map storage server comprises located in the cloud. For example, the map storage server comprises a computer that is building the map. For example, the map storage server comprises a computer that is part of an autonomous agent. For example, the map storage server comprises a primary computer comprised in the autonomous agent.

According to embodiments of the invention, a system for automatically annotating a map comprises a map stored on one or more map storage servers. For example, the map is a two-dimensional map representing an environment in which the robot operates. For example, the map is a three-dimensional map representing the environment in which the robot operates. For example, the system creates the map using methods of Simultaneous Localization and Mapping (SLAM). For example, the one or more robots use a scanning laser range finder to build a three-dimensional map of the facility by moving the laser out of the horizontal plane using one or more actuators. For example, to build the map, the one or more robots use a sensor package comprising one or more of an RGB-D camera, TOF camera, structured light camera, scanning laser range finder, and another sensor. For example, the system builds the map using one or more sensor packages that are moved by one or more persons. For example, the sensor packages are one or more of handheld and under-actuated.

For example, the environment comprises a warehouse. For example, the environment comprises a manufacturing facility. For example, the environment comprises one or more public roads.

The sensor package is typically moved through the environment. For example, the sensor package is moved through the environment by the motors of the robot. For example, the sensor package is moved through the environment by a human operator. For example, the sensor package is configured to capture data to use in the creation or annotation of the map. As the sensor package moves through the environment, data is captured to use in the creation or annotation of the map. This data typically consists of one or more laser scan measurements, camera images, odometric positions of where the data was captured. This data might also comprise other measurements such as visible Wifi access points, fiducials detected by a camera, IMU measurements, etc.

The system captures data and then builds a map using the data. The mapping process comprises determining a best estimate of a true position of each sensor measurement. This can be accomplished through a variety of methods.

Often, the map is stored by raytracing laser scan measurements into a two-dimensional (2D) map of the world and discarding the underlying data. While this certainly reduces the amount of data that is required to share the map, significant loss of information occurs. In one embodiment, our method retains the original sensor data, associating each measurement with the node in the graph at which the sensor measurement was taken. According to embodiments of the invention, in addition to exporting a 2D map of the world, the entire graph can be saved. Alternatively, or additionally, raw sensor measurements used to create the 2D map can be saved.

According to embodiments of the invention, the use of template matching to find the estimated location of items of interest involves the matching of templates against multiple segments that may be found during segmentation. For example, a robot charge dock might appear in a laser scan as a single, contiguous segment. For example, a shelf might appear as multiple segments, which must be combined into a single supersegment before the step of template matching.

A simple approach to creating supersegments is simply to form all of the possible supersegments of N segments. This is a very large set of supersegments to consider and likely is intractable to process for all but the simplest environments. Instead, according to embodiments of the invention, metrics can be used to allow more intelligent selection of segments to form a supersegment. The template can be preprocessed to determine how many segments it consists of (based on the jump distance). It is important to note that the direction from which the template is viewed may change the number of segments actually required, so the pre-processing step must operate in all directions. A clustering method with a separation distance equal to the jump distance will suffice. This sets the maximum number of segments to form a supersegment for our particular template. According to further embodiments of the invention, this would already reduce the number of supersegments that can be form from N segments. According to other embodiments of the invention, metrics can be computed on the segments that form the supersegment. One valuable metric is a maximum size that an individual segment can be, as many segments (such as those forming perimeter walls) will be very large.

Then, according to other embodiments of the invention, a bounding region can be computed for at least one of the segments. Preferably, a bounding region can be computed for each of the segments. For example, the bounding region comprises one or more a bounding circle and a bounding box. Next, according to further embodiments of the invention, segments can be discarded that are some percent larger than a largest segment that forms the template's supersegment. The margin of error allowed above the maximum size must be determined based on the sensor noise seen within the environment and will typically be empirically determined to avoid false-negatives. Additionally, according to yet further embodiments of the invention, the distance is determined between centroids of the individual segments. Subsequently according to yet other embodiments of the invention, it can be required that segments be positioned at certain distances from one another. Given a template having multiple segments, embodiments of the invention can iterate through all segments in the laser scan. According to yet further embodiments of the invention, the system notes segments in the scan that match template segments based on one or more of size metrics and other metrics. According to yet further embodiments of the invention, the system then determines a set of segments having a highest likelihood to be matched with the template.

According to embodiments of the invention, a method for automatic annotation of a map comprises the use of pre-trained models to locate items of interest within the sensor data. For example, the method uses a feature descriptor comprising one or more of FLIRT, SIFT, SURF, and Object Request Broker (ORB). For example, the method uses models trained from example sensor data of representative items of interest. For example, the method uses example sensor data to learn the expected features and their expected arrangement based on examples of representative item of interest. For example, the method uses a model of a charge dock, comprising several FLIRT features and their arrangement, to detect charge docks in laser scan data. For example, the method uses a model of a shelving unit, comprising several ORB features and their arrangement, to detect the location of shelving units in depth camera data.

According to embodiments of the invention, a method for automatically annotating a map comprises receiving and incorporating into map creation one or more initial estimates of item locations by a human annotator. For example, a human annotator may note estimated locations of charge docks within their facility. For example, a human annotator may use a web-based application interface to view the map and add annotations. For example, a human annotator clicks the approximate location of the charge dock in the map to note an estimated position. For example, the method uses the initial estimate from a human annotator to bootstrap the template matching. For example, the method uses the initial estimate from a human annotator to bootstrap an Iterative Closest Point (ICP) computation. For example, the method uses the initial estimate from a human annotator to locate shelving using a trained model comprising ORB features.

According to embodiments of the invention, a method for automatically annotating a map comprises an optional step in which a human annotator can modify the annotations. For example, the human annotator may remove certain items of interest that do not in fact exist in the environment when the automatic portions of the method are inaccurate. For example, the human annotator may add additional information to the annotation. For example, the human annotator may add a name to the annotation. For example, the human annotator may add a name to a shelf annotation, denoting the name the shelving unit takes within the Warehouse Management System (WMS). For example, the human annotator may add a name to a conveyor apparatus, denoting the designation the conveyor has within the Warehouse Management System (WMS).

FIG. 1 is a system diagram for a system 100 for automatically annotating a map, including a robot 105, file storage 110, a server 120, an annotations database 130, an automatic annotation service 140, a queue 150 of annotation requests, and a computer 160. The robot 105 is operably connected to the server 120. The file storage 110 is operably connected to the server 120. For example, the server comprises an application programming interface (API) server. The server 120 is operably connected to the annotations database 130. The server 120 is further operably connected to the automatic annotation service 140. The automatic annotation service 140 is operably connected to the queue 150. The server 150 is further operably connected to the computer 160. The automatic annotation service 140 is configured to build a map. The automatic annotation service 140 is configured to build the map using one or more of data captured by the robot and input by a human annotator. For example, the input comprises an estimate of a location of an item of interest by the human annotator.

The computer 160 comprises a graphic user interface (GUI) 170 usable by a human user (not shown in this figure). Depicted are two GUI screenshots, a first GUI screenshot 180A and a second GUI screenshot 180B. In the first GUI screenshot 180A, the user requests an automatic map annotation of a feature of interest. In the second GUI screenshot 180B, the GUI presents the automatically annotated map to the user, and the user is allowed to make any needed edits. The first GUI screenshot 180A comprises a first map 190A. The first GUI screenshot receives a first user input 195A, a user request for an automatic annotation of the first map 190A. For example, the first user input comprises an edit by the user of the first map 190A.

The system sends the request from the GUI 170 of the computer 160 to the server 120 and then to the automatic annotation service 140, where the requested automatic annotation using one or more of the annotation database 130 and the file storage 110 as needed. The system then transmits the automatically annotated map from the automatic annotation service 140 to the server 120 and then to the computer 160, where it is displayed on the GUI 170 as a second map 190B in the second GUI screenshot 180B. The second GUI screenshot 180B further comprises a second user input 195B, allowing the user to enter optional edits of the second map 190B via the GUI 170 to the computer 160 for transmission to the server 120 and incorporation into the second map 190B.

FIGS. 2A-2B are a set of two maps illustrating a first method for automatically annotating a map.

FIG. 2A is a simple map 200 illustrating a first method for automatically annotating a map. White pixels 210 represent areas where the robot has detected free space, available to the robot and not occupied by an obstacle. Gray pixels 220A-220E indicate areas that have not yet been directly observed by the robot. Black pixels 230A-230E represent areas where the robot has detected an obstacle.

FIG. 2B shows a resulting map 250 after, according to the first method for automatically annotating a map, the system sets corners 260A-260D of the map 250 to a frontier marking, creating frontier corners 260A-260D. For example, as shown, the frontier corners 260A-260D are shown by vertical lines. White pixels 210 again represent areas where the robot has detected free space, available to the robot and not occupied by an obstacle. Gray pixels 220A-220E again indicate areas that have not yet been directly observed by the robot. Black pixels 230A-230E again represent areas where the robot has detected an obstacle.

FIG. 3 shows a resulting map 300 after, according to the first method for automatically annotating a map, the system performs a first flood fill near each of the corners 260A-260D, using the corners 260A-260D as seeds for the flood fill. The system then categorizes pixels 310A-310D that are adjacent to a corresponding corner 260A-260D as neighbor pixels if the pixels 310A-310D comprise unobserved pixels. If the pixels 310A-310D that are adjacent to a corresponding corner 260A-260D do not comprise unobserved pixels, the system leaves them unchanged. According to embodiments of the invention, the flood fill results in generation of the neighbor pixels 310A-310D adjacent to the corresponding frontier pixels 260A-260D. White pixels 210 again represent areas where the robot has detected free space, available to the robot and not occupied by an obstacle. Gray pixels 220A-220E again indicate areas that have not yet been directly observed by the robot. Black pixels 230A-230E again represent areas where the robot has detected an obstacle.

FIG. 4 shows a resulting map 400 after, according to the first method for automatically annotating a map, the system sets the neighbor pixels 310A-310D to a frontier marking, which as shown comprises vertical lines. This creates expanded frontier corners 410A-410D, which are larger than the frontier corners 260A-260D shown in FIG. 2B. White pixels 210 again represent areas where the robot has detected free space, available to the robot and not occupied by an obstacle. Gray pixels 220A-220E again indicate areas that have not yet been directly observed by the robot. Black pixels 230A-230E again represent areas where the robot has detected an obstacle.

Figure 5:
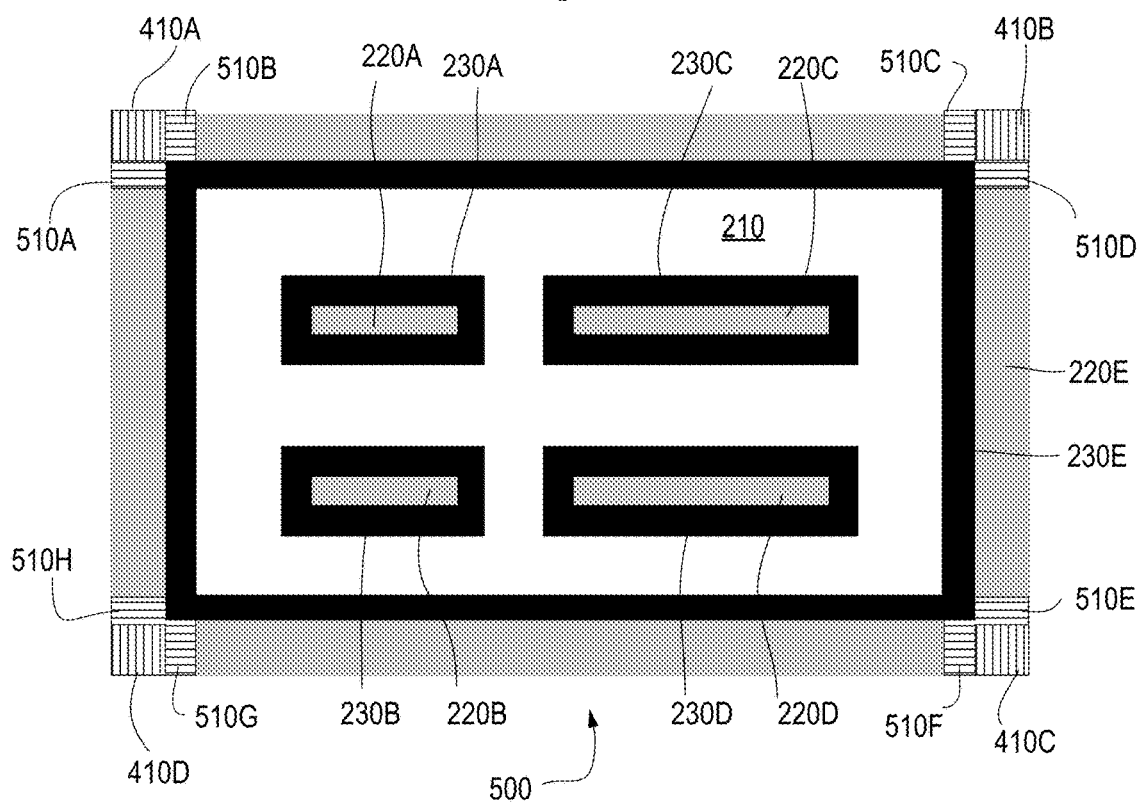
FIG. 5 shows a resulting map after, according to the first method for automatically annotating a map, the system performs a second flood fill near each of the expanded frontier corners.

FIG. 5 shows a resulting map 500 after, according to the first method for automatically annotating a map, the system performs a second flood fill near each of the expanded frontier corners 410A-410D, using the expanded frontier corners 410A-410D as seeds for the flood fill. Again the frontier marking of the expanded frontier corners 410A-410D comprises vertical lines. White pixels 210 again represent areas where the robot has detected free space, available to the robot and not occupied by an obstacle. Gray pixels 220A-220E again indicate areas that have not yet been directly observed by the robot. Black pixels 230A-230E again represent areas where the robot has detected an obstacle.

The system then categorizes expanded neighbor pixels 510A-510H that are adjacent to a corresponding expanded frontier corner 410A-410D as neighbor pixels 510A-510H if the expanded neighbor pixels 510A-510H comprise unobserved pixels 510A-510H. If the expanded neighbor pixels 510A-510H that are adjacent to a corresponding expanded frontier corner 410A-410D do not comprise unobserved pixels 510A-510H, the system leaves them unchanged. According to embodiments of the invention, the flood fill results in generation of the expanded neighbor pixels 510A-510H adjacent to the corresponding expanded frontier pixels 410A-410D. White pixels 210 again represent areas where the robot has detected free space, available to the robot and not occupied by an obstacle. Gray pixels 220A-220E again indicate areas that have not yet been directly observed by the robot. Black pixels 230A-230E again represent areas where the robot has detected an obstacle.

Figure 6:
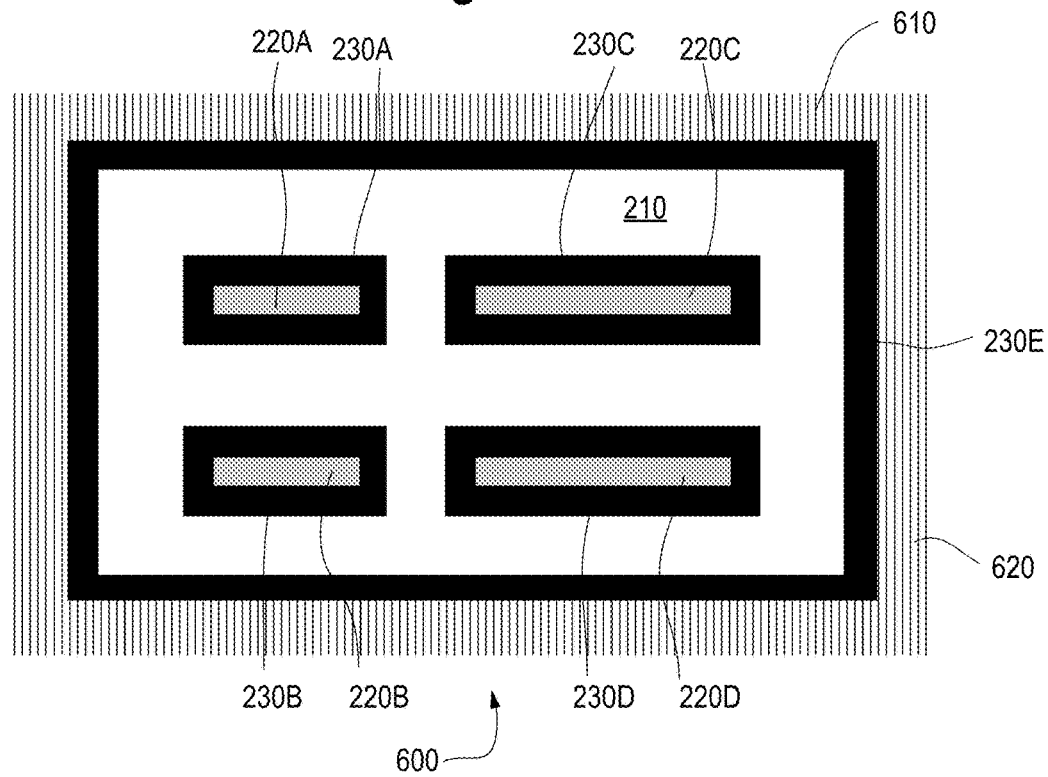
FIG. 6 shows a resulting map after, according to the first method for automatically annotating a map, steps of flood fill and expansion of neighbors have been repeated until all unobserved pixels have been set to the frontier marking.

FIG. 6 shows a resulting map 600 after, according to the first method for automatically annotating a map, steps of flood fill (FIGS. 3 and 5) and expansion of neighbors (FIGS. 3 and 5) have been repeated until all unobserved pixels 610 have been set to the frontier marking (vertical lines) for frontier pixels 610 and no more neighboring frontier pixels remain, creating a further expanded frontier region 620 comprising a boundary 620.

The boundary 620 replaces the previous gray pixels 220E in FIGS. 2A, 2B, and 3-5. The boundary 620 separates the frontier pixels 610 from the band of black pixels 230E. White pixels 210 again represent areas where the robot has detected free space, available to the robot and not occupied by an obstacle. Gray pixels 220A-220D again indicate areas that have not yet been directly observed by the robot. Black pixels 230A-230E again represent areas where the robot has detected an obstacle.

Figure 7:
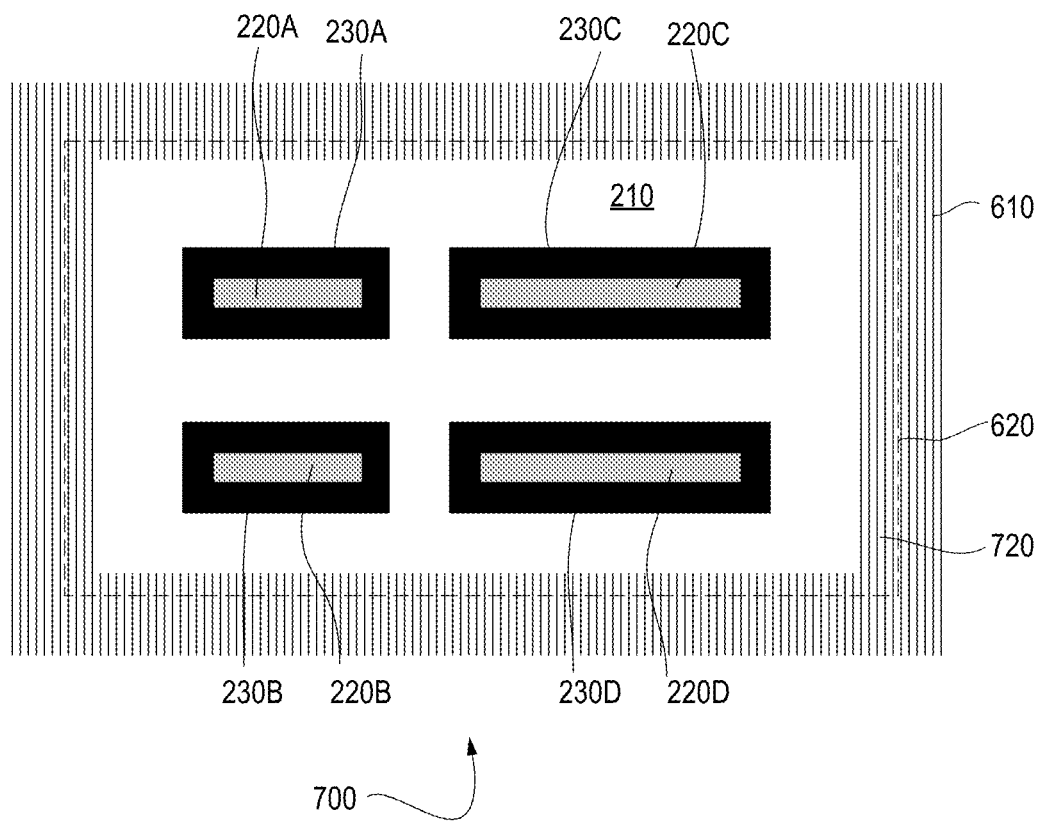
FIG. 7 shows a resulting map after, according to the first method for automatically annotating a map, the frontier pixels are dilated by a frontier bridge increment.

FIG. 7 shows a resulting map 700 after, according to the first method for automatically annotating a map, the frontier pixels 610 are dilated by a frontier bridge increment 710 relative to the previous map 600 shown in FIG. 6. For example, the system determines the frontier bridge increment 710. For example, a user predetermines the frontier bridge increment 710. According to the dilation process, a dilated pixel bordering an adjacent pixel of a selected color (white, gray, or black) is set to the color of the adjacent pixel. As a result, a dilated band 720 bounded by the boundary 620 is set to a color of the frontier pixels 610, that is, the dilated band 720 is added to the frontier pixels 610.

The frontier bridge increment 710 determines how many times the process is repeated, each time using a frontier bridge increment of one pixel. The system repeats the dilation process a number of times equal to a number of pixels comprised in the frontier bridge increment 710. For example, if the frontier bridge increment 710 is three pixels, the process repeats three times. As depicted in this example the frontier bridge increment 710 comprises one pixel. The frontier pixels 610, now expanded by the frontier bridge increment 710, have replaced previous black pixels 230E in FIGS. 2A, 2B, and 3-6.

The frontier pixels 610 are shown again. White pixels 210 again represent areas where the robot has detected free space, available to the robot and not occupied by an obstacle. Gray pixels 220A-220D again indicate areas that have not yet been directly observed by the robot. Black pixels 230A-230D again represent areas where the robot has detected an obstacle.

FIG. 8 shows a resulting map 800 after, according to the first method for automatically annotating a map, all frontier pixels (items 610 and 720 in FIG. 7, marked by vertical lines) are converted to free space, indicated by a white color. This has the effect of removing the outer walls 610 of the previous map 700. This also has the effect of removing from the map 800 all white pixels, formerly item 210 in FIGS. 2A, 2B, and 3-7. Gray pixels 220A-220D again indicate areas that have not yet been directly observed by the robot. Black pixels 230A-230D again represent areas where the robot has detected an obstacle. The obstacle pixels 230A are separated from the obstacle pixels 9230C by an obstacle bridge increment 810. The obstacle pixels 230B are separated from the obstacle pixels 230D by the obstacle bridge increment 810.

FIG. 9 shows a resulting map 900 after, according to the first method for automatically annotating a map, all remaining unobserved pixels (items 220A-220D in FIG. 8) are converted to obstacle pixels, indicated by a black color. This has the effect of filling and creating expanded black pixel regions 930A-930D, indicating obstacle pixels 930A-930D. The obstacle pixels 930A are separated from the obstacle pixels 930C by the frontier bridge increment 710. The obstacle pixels 930B are separated from the obstacle pixels 930D by an obstacle bridge increment 810.

Figure 10:
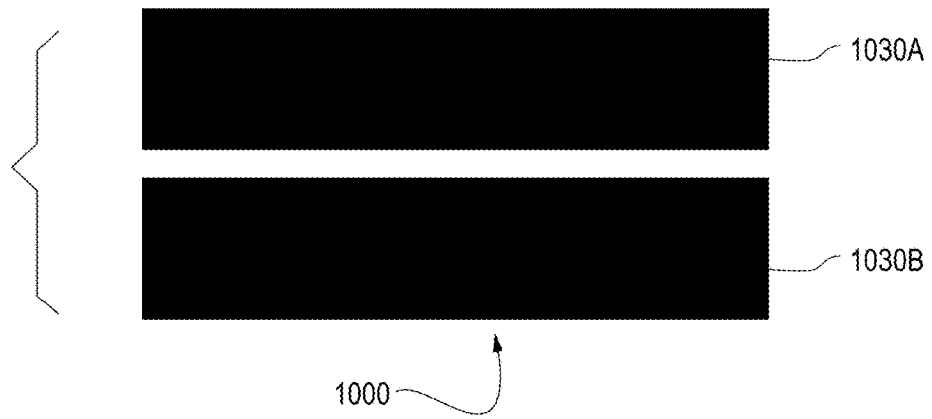
FIG. 10 shows a resulting map after, according to the first method for automatically annotating a map, all black obstacle pixels are dilated by an obstacle bridge increment.

FIG. 10 shows a resulting map 1000 after, according to the first method for automatically annotating a map, all black obstacle pixels 930A-930D are dilated by an obstacle bridge increment 810 shown in FIG. 9. This creates two larger sets of black obstacle pixels 1030A and 1030B.

Accordingly, this step has the effect of filling in the obstacle pixels 930A-930D shown in FIG. 9, creating two black obstacle pixel regions 1030A and 1030B in place of the four black obstacle pixel regions 930A-930D shown in FIG. 9.

Figure 11:
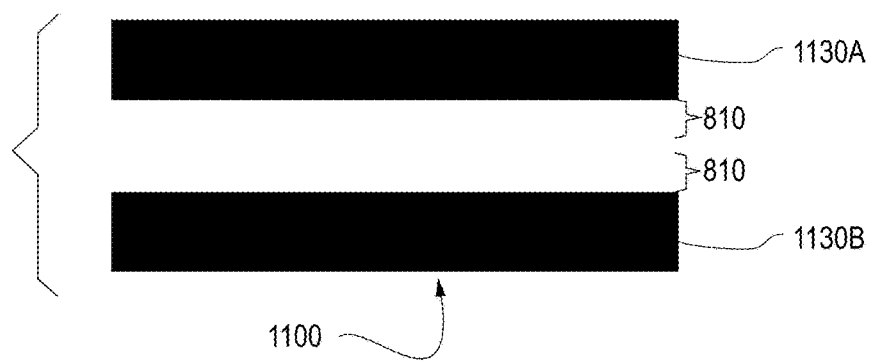
FIG. 11 shows a resulting map after, according to the first method for automatically annotating a map, all black obstacle pixels are eroded by the obstacle bridge increment.

FIG. 11 shows a resulting map 1100 after, according to the first method for automatically annotating a map, all black obstacle pixels (regions 1030A and 1030B in FIG. 10) are eroded by the obstacle bridge increment 810. Erosion is an opposite process of dilation. If a pixel of a selected color borders a neighboring pixel not of that selected color, erosion sets the pixel to a color of the neighboring pixel. This has the effect of shrinking the regions of black obstacle pixels (regions 1030A and 1030B in FIG. 10) back to their prior size as seen in FIG. 9 but leaving them connected. Accordingly, FIG. 11 still has two black obstacle pixel regions 1130A and 1130B but each is smaller than the respective black obstacle regions 1030A and 1030B in FIG. 10.

Figure 12:
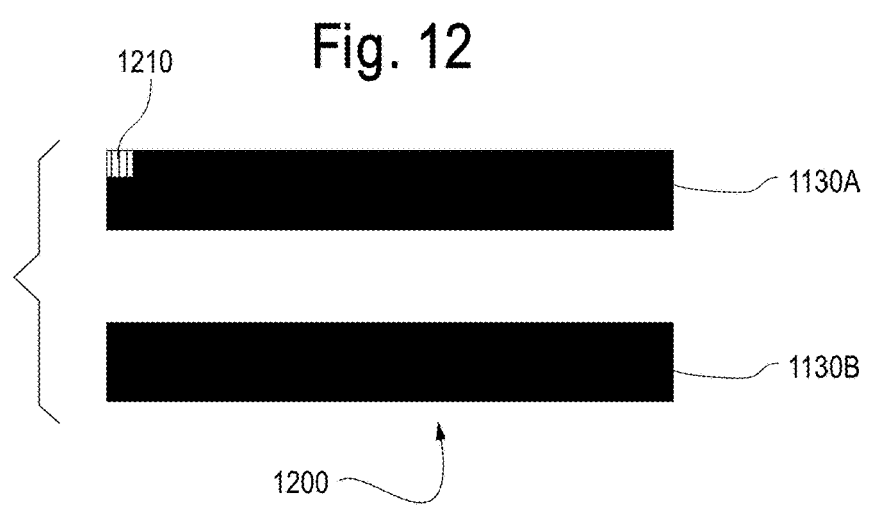
FIG. 12 shows a resulting map after, according to the first method for automatically annotating a map, the system iterates through the map and identifies a black obstacle pixel as a seed pixel that is not presently part of an obstacle group.

FIG. 12 shows a resulting map 1200 after, according to the first method for automatically annotating a map, the system iterates through the map 1200 and identifies a black obstacle pixel 1210 as a seed pixel 1210 that is not presently part of an obstacle group as none has yet been created. For example, the seed pixel 1210 is shown with vertical lines. Also shown again are the two black obstacle regions 1130A and 1130B in FIG. 11.

Figure 13:
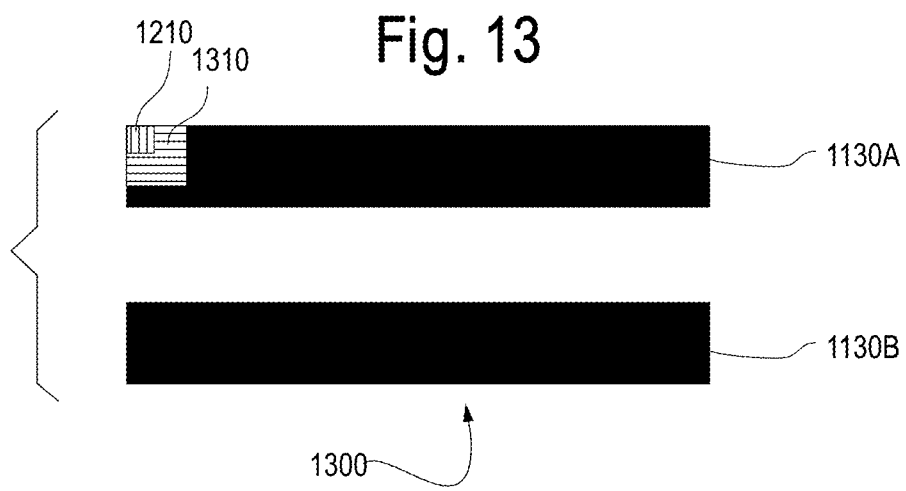
FIG. 13 shows a resulting map after, according to the first method for automatically annotating a map, the system uses the black obstacle pixel as the seed pixel to create a new connected group.

FIG. 13 shows a resulting map 1300 after, according to the first method for automatically annotating a map, the system uses the black obstacle pixel 1210 as the seed pixel 1210 to create a new connected group 1310. The connected group 1310 comprises a set of contiguous obstacle pixels 1310 that are contiguous to the seed pixel 1210. In analogy with the flood fill process shown in FIGS. 3 and 5 to generate frontier pixels, the system performs a connected pixel search to find all contiguous obstacle pixels 1310 connected to the seed pixel 1210. For example, the seed pixel 1210 is shown by vertical lines. For example, as shown, the contiguous obstacle pixels 1310 are shown by horizontal lines. Also shown again are the two black obstacle regions 1130A and 1130B in FIGS. 11 and 12.

Figure 14:
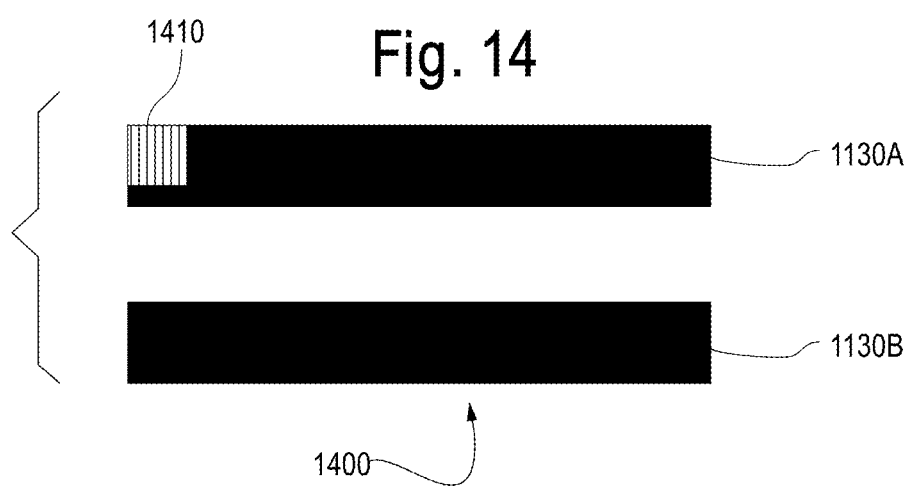
FIG. 14 shows a resulting map after, according to the first method for automatically annotating a map, the system adds the contiguous obstacle pixels to the seed pixel, creating a larger obstacle group.

FIG. 14 shows a resulting map 1400 after, according to the first method for automatically annotating a map, the system adds the contiguous obstacle pixels (item 1310 in FIG. 13) to the seed pixel (item 1210 in FIGS. 12 and 13), creating a larger obstacle group 1410. The obstacle group 1410 is shown by vertical lines. Shown again are the two black obstacle regions 1130A and 1130B in FIGS. 11-13.

Figure 15:
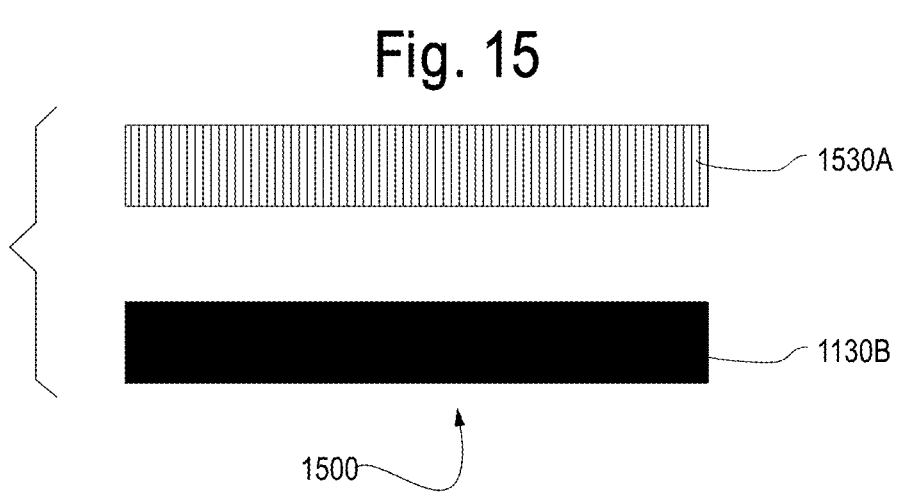
FIG. 15 shows a resulting map after, according to the first method for automatically annotating a map, repeating the steps outlined in FIGS. 12-14 until all pixels connected by black obstacle pixels to the original seed pixel are added.

FIG. 15 shows a resulting map 1500 after, according to the first method for automatically annotating a map, repeating the steps outlined in FIGS. 12-14 until all pixels connected by black obstacle pixels to the original seed pixel (item 1210 in FIGS. 12 and 13) are added to create a first finished obstacle group 1510. The first finished obstacle group 1510 is shown by vertical lines. Shown again is the black obstacle region 1130B in FIGS. 11-14.

Figure 16:
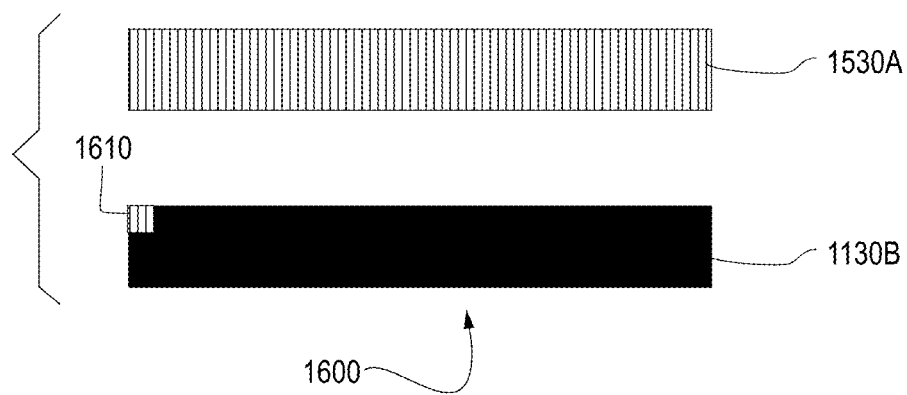
FIG. 16 shows a resulting map after the same process shown in FIG. 12 is performed on the lower region.

FIG. 16 shows a resulting map 1600 after the same process shown in FIG. 12 is performed on the lower region 230. The system iterates through the lower region 230 of the map 1600 and identifies a black obstacle pixel 1610 as a seed pixel 1610 that is not presently part of an obstacle group. For example, as shown, the seed pixel 1610 is shown with vertical lines. Shown again is the first finished obstacle group 1510 in FIG. 15. Shown again is the black obstacle region 1130B in FIGS. 11-15.

Figure 17:
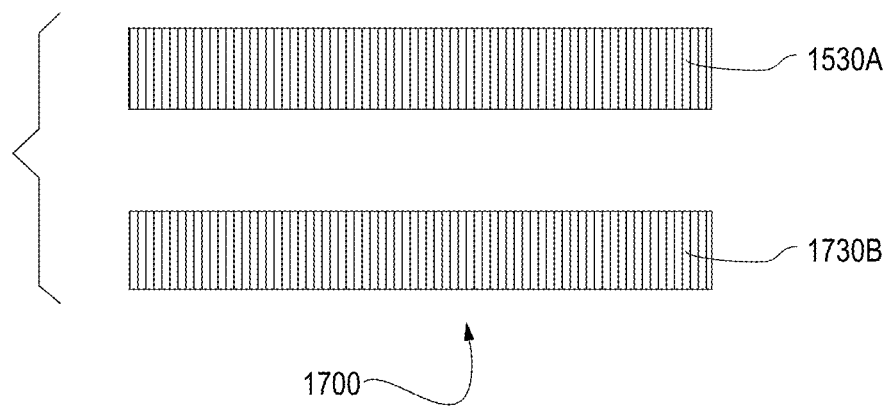
FIG. 17 shows a resulting map after the same process shown in FIGS. 13-15 is performed on the lower black obstacle region.

FIG. 17 shows a resulting map 1700 after the same process shown in FIGS. 13-15 is performed on the lower black obstacle region 1130B. The system generates a second finished obstacle group 1710. Also shown again is the first finished obstacle group 1510. The system iterates through the map 1700 again but finds no more black obstacle pixels that do not already belong to one or more of the first finished obstacle group 1510 and the second finished obstacle group 1710.

Figure 18:
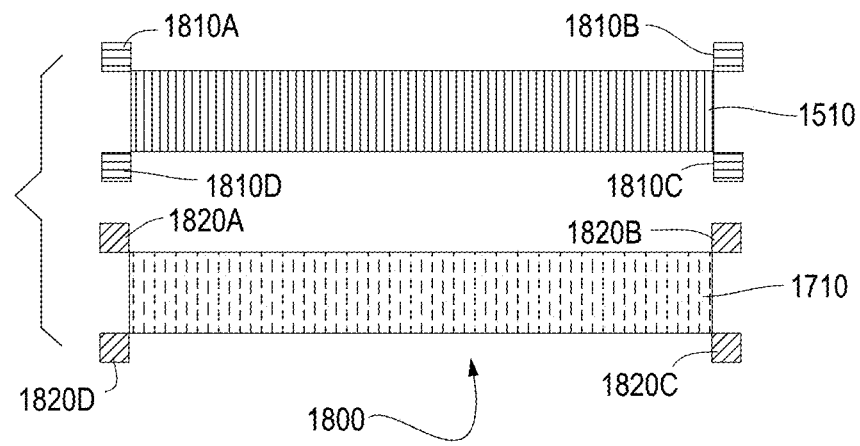
FIG. 18 shows a resulting map after the system creates a convex hull for the first finished obstacle group and after the system creates a convex hull for the second finished obstacle group.

FIG. 18 shows a resulting map 1800 after the system creates a convex hull for the first finished obstacle group 1510 and after the system creates a convex hull for the second finished obstacle group 1710. A convex hull operation creates as output vertices of a convex enclosing polygon that minimizes its area for a given set of points. A colloquial description of a convex hull is that if all the points of interest 1510 or 1710 were nails, the convex hull would be a shape of a rubber band stretched to surround all those nails. In this case, the given set of points is the pixels in either the first finished obstacle group 1510 or the second finished obstacle group 1710.

The system identifies first output vertices 1810A-1810D for the first finished obstacle group 1510. The system identifies second output vertices 1820A-1820D for the second finished obstacle group 1710.

The first output vertices 1810A-1810D comprise vertices of a first keepout polygon 1510. The second output vertices 1820A-1820D comprise vertices of a second keepout polygon 1710. The system then displays the final map 1800 on the graphical user interface.

If needed, the system can use path simplification techniques to enhance the results. For example, the system can employ Ramer-Douglas-Peucker techniques. Alternatively, or additionally, the system can create annotations consistent with the final map 1800.

Figure 19:
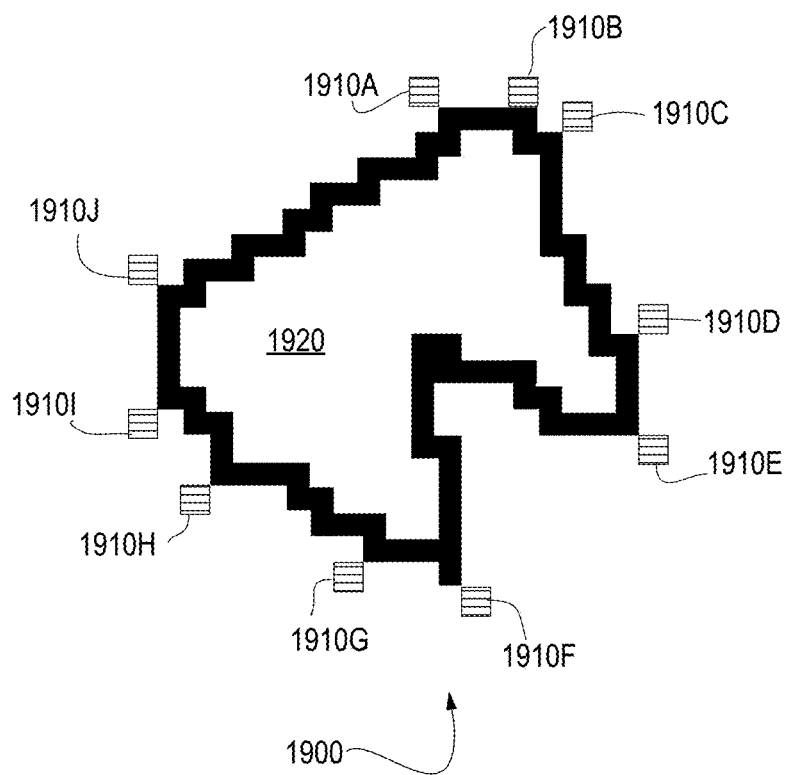
FIG. 19 shows an exemplary map created by a similar method of convex hull vertices for a more complex, non-convex object.

FIG. 19 shows an exemplary map 1900 created by a similar method of convex hull vertices 1910A-1910J for a more complex, non-convex object 1920.

Figure 20:
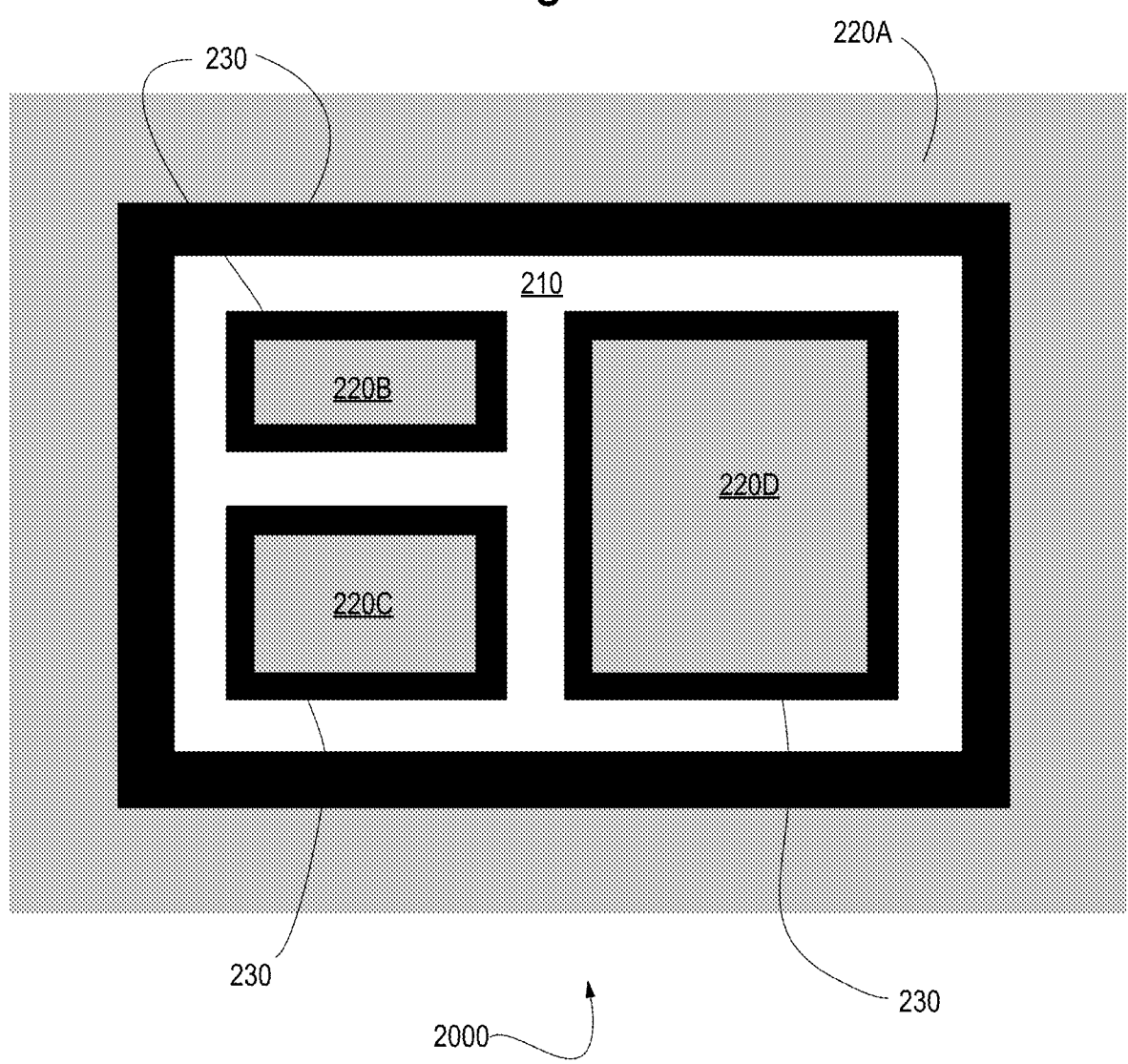
FIG. 20 is a simple map illustrating a second method for automatically annotating a map.

FIG. 20 is a simple map 2000 illustrating a second method for automatically annotating a map. White pixels 210 again represent areas where the robot has detected free space, available to the robot and not occupied by an obstacle. Gray pixels 220A-220D again indicate areas that have not yet been directly observed by the robot. Black pixels again 230 represent areas where the robot has detected an obstacle. The starting map 2000 is the same map 2000 as the map 200 from which we started the first method in FIG. 2A.

Figure 21:
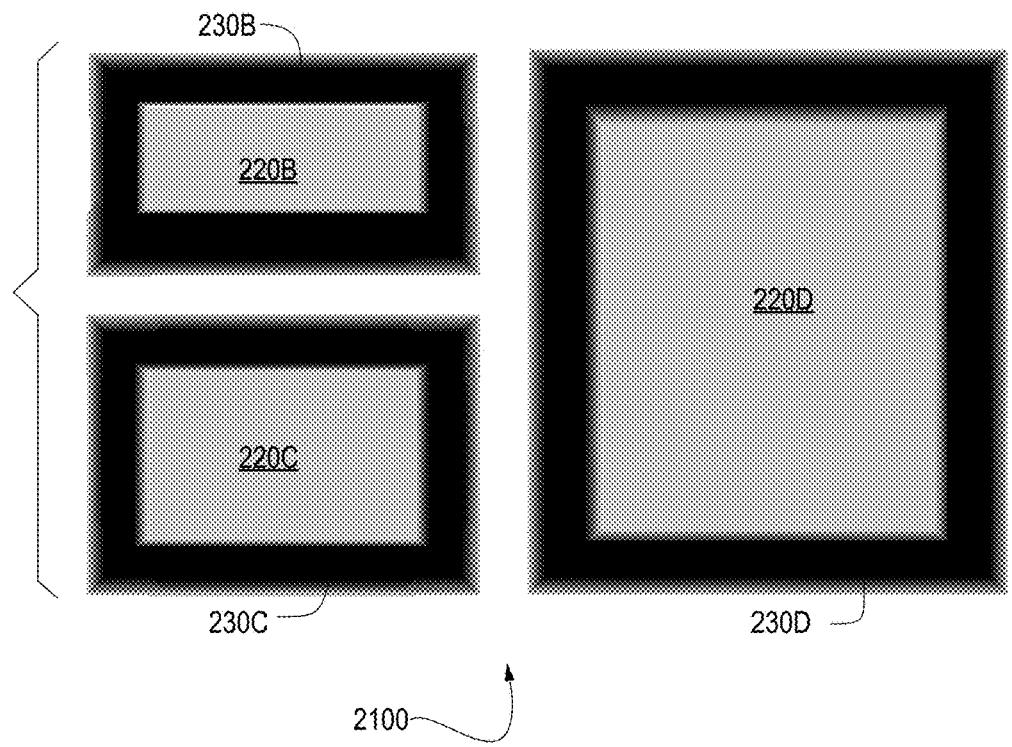
FIG. 21 shows a resulting map after, according to the second method for automatically annotating a map, the system performs a flood fill to dilate all exterior gray pixels.

FIG. 21 shows a resulting map 2100 after, according to the second method for automatically annotating a map, the system performs a flood fill to dilate all exterior gray pixels to perform a removal of exterior wall 220A in FIG. 20. Shown again are the gray pixel areas 220B-220D, and the black pixel areas 230B-230D.

Figure 22:
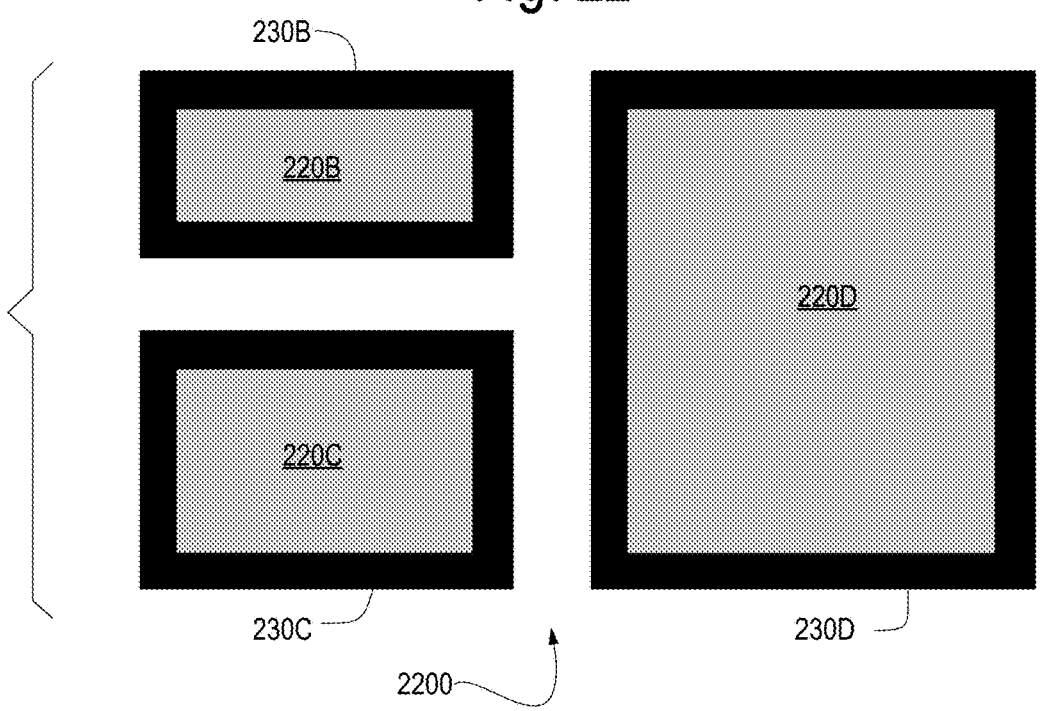
FIG. 22 shows a resulting map after, according to the second method for automatically annotating a map, the system performs smoothing of the entire map.

FIG. 22 shows a resulting map 2200 after, according to the second method for automatically annotating a map, the system performs smoothing of the entire map 2100 in FIG. 21. For example, the system performs Gaussian smoothing of the entire map 2100 in FIG. 21. Shown again are the gray pixel areas 220B-220D, and the black pixel areas 230A-230D.

Figure 23:
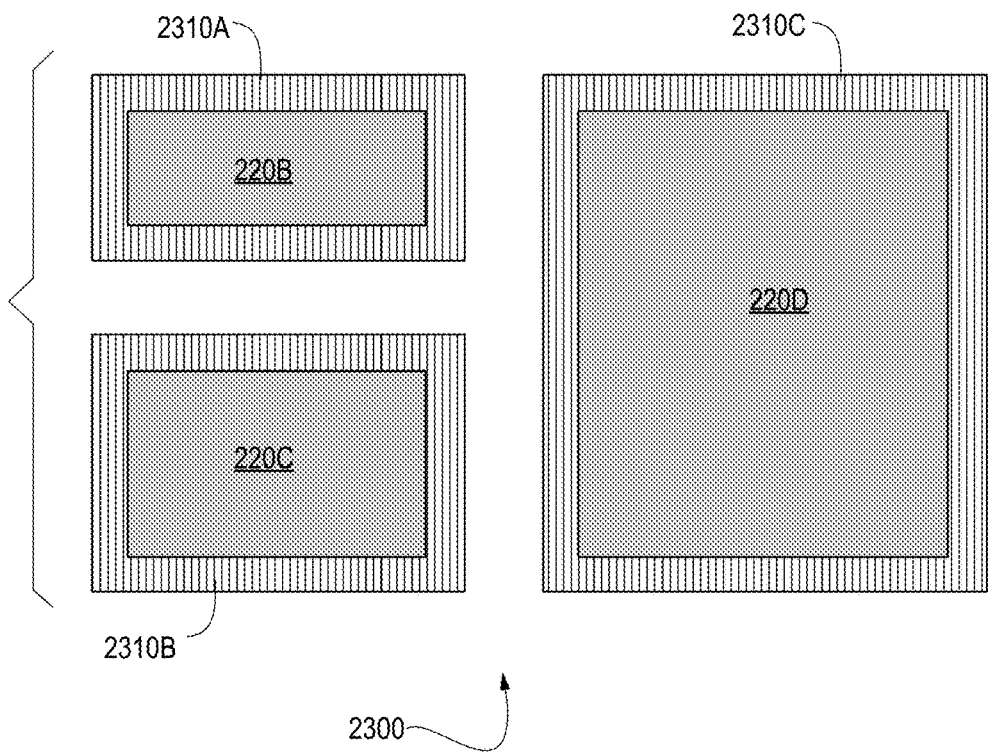
FIG. 23 shows a resulting map after, according to the second method for automatically annotating a map, the system performs edge detection on the entire map.

FIG. 23 shows a resulting map 2300 after, according to the second method for automatically annotating a map, the system performs edge detection on the entire map 2200 in FIG. 22 to find all possible edges in the map 2200 and to show them as edge regions 2310A, 2310B, and 2310C in the map 2300. Shown again are the gray pixel areas 220B-220D, and the black pixel areas 230A-230D.

Figure 24:
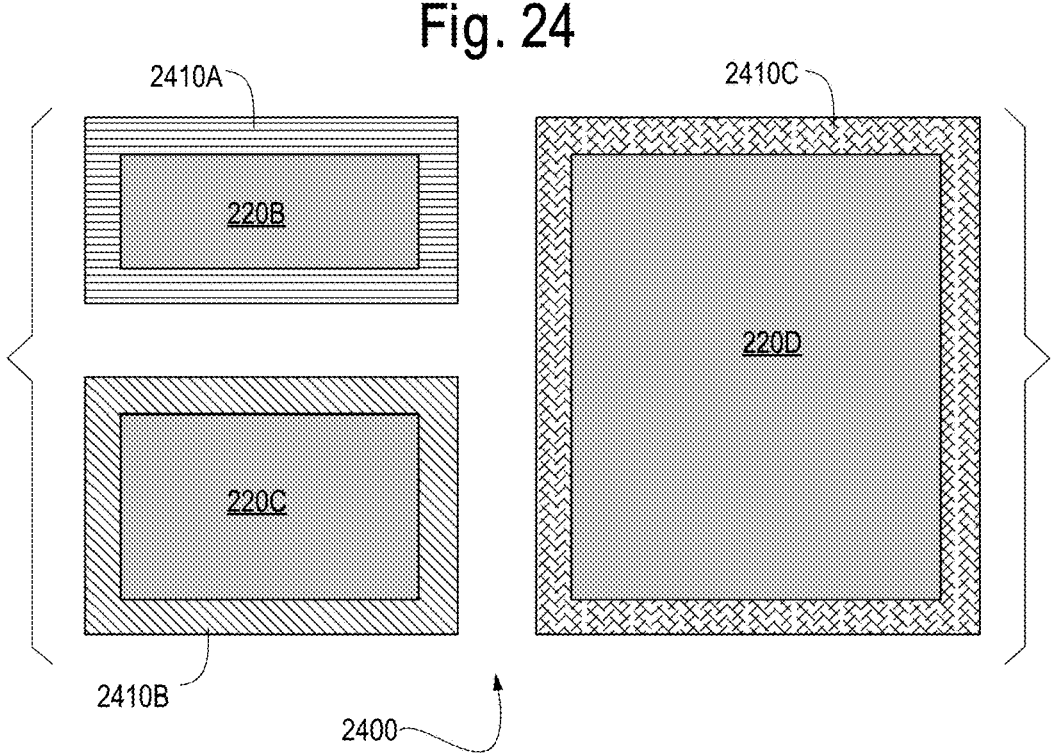
FIG. 24 shows a resulting map after, according to the second method for automatically annotating a map, the system performs a nearest neighbor clustering technique to identify clusters.

FIG. 24 shows a resulting map 2400 after, according to the second method for automatically annotating a map, the system performs a nearest neighbor clustering technique on edge regions 2310A, 2310B, and 2310C to identify clusters 2410A, 2410B, and 2410C. Shown again are the white pixel area 210, the gray pixel areas 220B-220D, and the black pixel areas 230A-230D.

Figure 25:
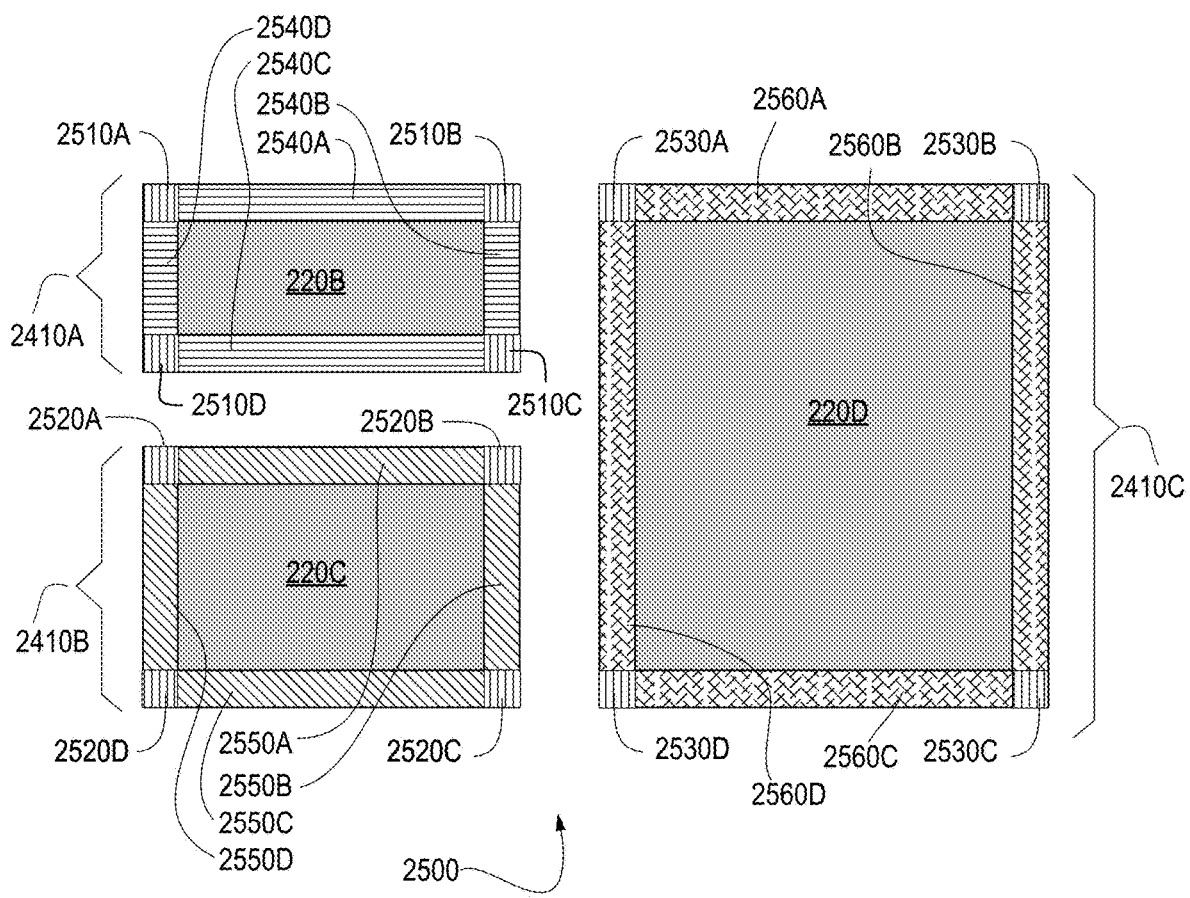
FIG. 25 shows a resulting map after, according to the second method for automatically annotating a map, the system creates a convex hull for the clusters.

FIG. 25 shows a resulting map 2500 after, according to the second method for automatically annotating a map, the system creates a convex hull for the clusters 2410A, 2410B, and 2410C. As in the first method, the convex hull operation creates as output vertices of a convex enclosing polygon that minimizes its area for a given set of points. Shown again are the white pixel area 210, the gray pixel areas 220B-220D, and the black pixel areas 230A-230D.

The system identifies first output vertices 2510A-2510D for the first cluster 2410A. The system identifies second output vertices 2520A-2520D for the second cluster 2410B. The system identifies third output vertices 2530A-2530D for the third cluster 2410A. The system also identifies first polygon sides 2540A-2540D for the first cluster 2410A. The system also identifies second polygon sides 2550A-2550D for the second cluster 2410B. The system also identifies third polygon sides 2560A-2560D for the third cluster 2410C.

The first output vertices 2510A-2510D comprise vertices of a first keepout polygon 2410A. The first polygon sides 2540A-2540D comprise sides of the first keepout polygon 2410A. The second output vertices 2520A-2520D comprise vertices of a second keepout polygon 2410B. The second polygon sides 2550A-2550D comprise sides of the second keepout polygon 2410B. The third output vertices 2530A-2530D comprise vertices of a third keepout polygon 2410C. The third polygon sides 2560A-2560D comprise sides of the third keepout polygon 2410C.

The system then displays the final map 2500 on the graphical user interface. The system can create annotations consistent with the final map 2500.

Figure 26:
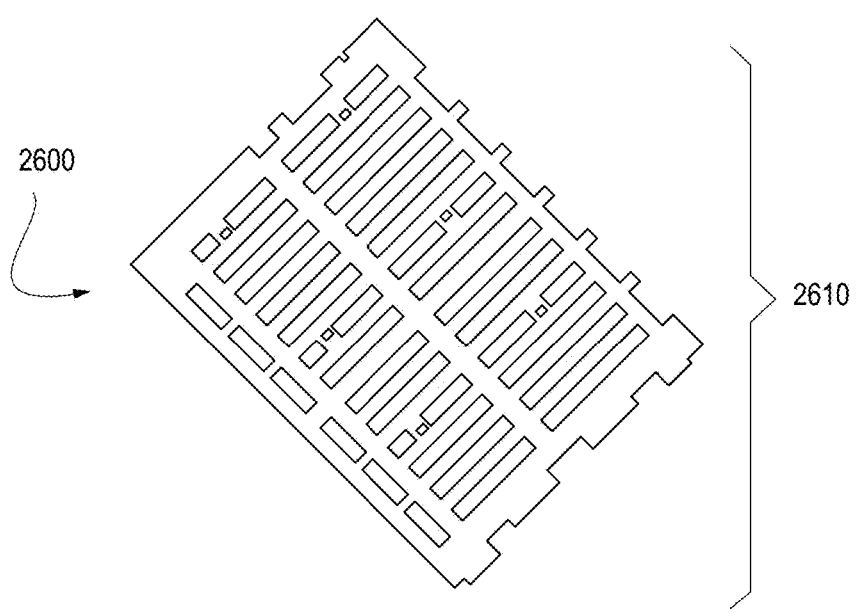
FIG. 26 shows a display on a graphical user interface of an exemplary map created by a similar method for a more complex terrain.

FIG. 26 shows a display 2600 on a graphical user interface of an exemplary map 2610 created by a similar method for a more complex terrain.

Figure 27:
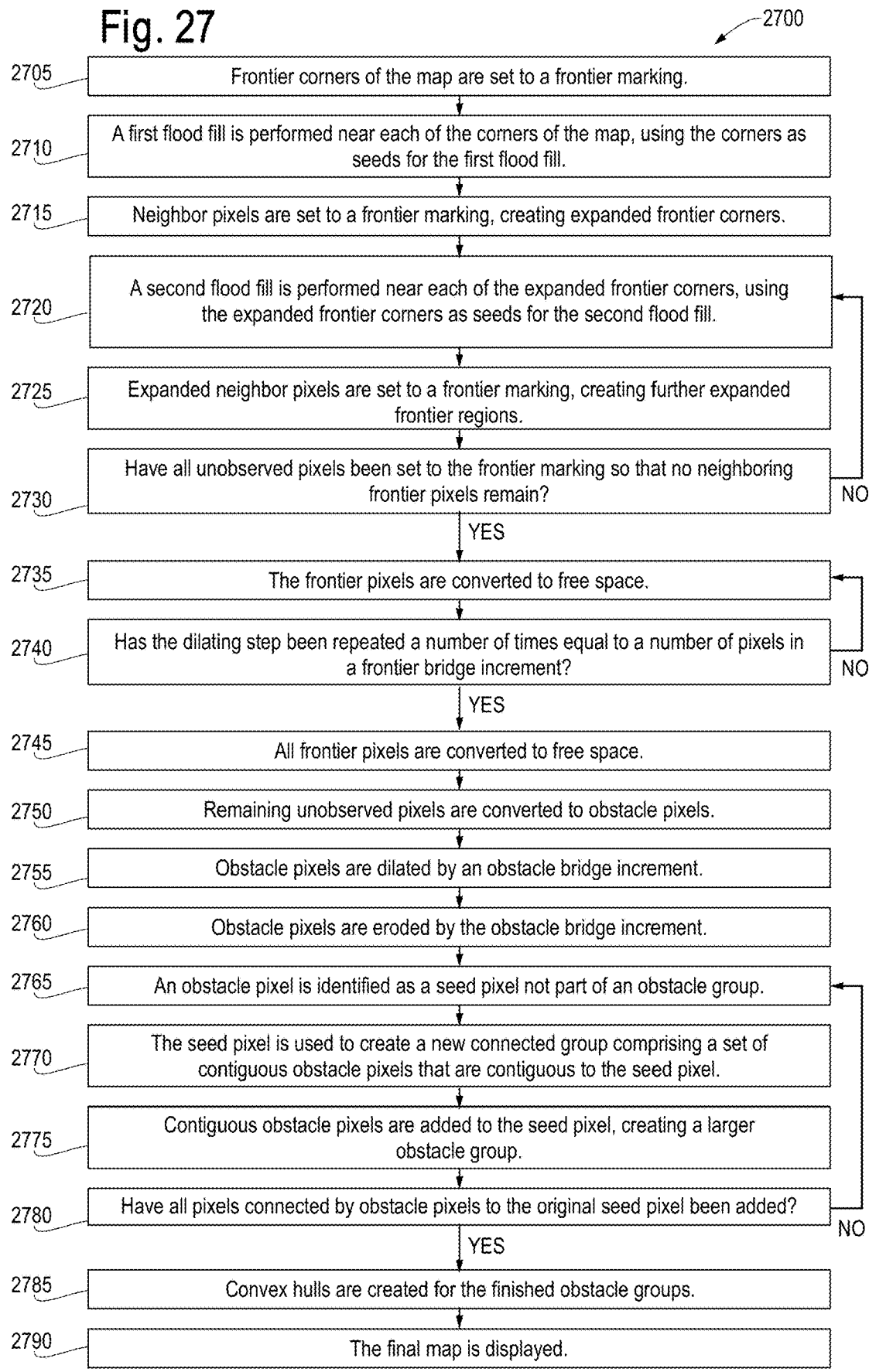
FIG. 27 is a flow chart of a first method for automatically annotating a robotic map.

FIG. 27 is a flow chart of a first method 2700 for automatically annotating a robotic map.

The order of the steps in the method 2700 is not constrained to that shown in FIG. 27 or described in the following discussion. Several of the steps could occur in a different order without affecting the final result.

In step 2705, frontier corners of the map are set to a frontier marking. Block 2705 then transfers control to block 2710.

In step 2710, a first flood fill is performed near each of the corners of the map, using the corners as seeds for the first flood fill. Block 2710 then transfers control to block 2715.

In step 2715, neighbor pixels are set to a frontier marking, creating expanded frontier corners. Block 2715 then transfers control to block 2720.

In step 2720, a second flood fill is performed near each of the expanded frontier corners, using the expanded frontier corners as seeds for the second flood fill. Block 2720 then transfers control to block 2725.

In step 2725, expanded neighbor pixels are set to a frontier marking, creating further expanded frontier regions. Block 2725 then transfers control to block 2730.

In step 2730, it is queried whether all unobserved pixels have been set to the frontier marking and no more neighboring frontier pixels remain. If no, the process loops back to block 2720 for repetition of the steps of flood fill and setting expanded neighbor pixels to a frontier marking. If yes, the process proceeds to block 2735.

In step 2735, the frontier pixels are dilated by one pixel. Block 2735 then transfers control to block 2740.

In step 2740, it is queried whether the dilating step has been repeated a number of times equal to a number of pixels in a frontier bridge increment. If no, the process loops back to step 2735 for another dilation of the frontier pixels. If yes, the process proceeds to block 2745.

In step 2745, all frontier pixels are converted to free space. For example, the step of converting the frontier pixels comprises removing free space in the map. Block 2745 then transfers control to block 2750.

In step 2750, remaining unobserved pixels are converted to obstacle pixels. Block 2750 then transfers control to block 2755.

In step 2755, obstacle pixels are dilated by an obstacle bridge increment. Block 2755 then transfers control to block 2760.

In step 2760, obstacle pixels are eroded by the obstacle bridge increment. Block 2760 then transfers control to block 2765.

In step 2765, an obstacle pixel is identified as a seed pixel not part of an obstacle group. Block 2765 then transfers control to block 2770.

In step 2770, the seed pixel is used to create a new connected group comprising a set of contiguous obstacle pixels that are contiguous to the seed pixel. Block 2770 then transfers control to block 2775.

In step 2775, contiguous obstacle pixels are added to the seed pixel, creating a larger obstacle group. Block 2775 then transfers control to block 2780.

In step 2780, it is queried if all pixels connected by obstacle pixels to the original seed pixel have been added, creating finished obstacle groups. If no, the process loops back to step 2765 for repetition of the steps of identifying the obstacle pixel, using the seed pixel to create a new connected group, and adding contiguous obstacle pixels to the seed pixel. If yes, the process proceeds to block 2785.

In step 2785, convex hulls are created for the finished obstacle groups. Block 2785 transfers control to block 2790.

In step 2790, the final map is displayed. For example, the displaying step comprises identifying output vertices for the finished obstacle groups. For example, the identified output vertices comprise vertices of one or more keepout polygons. Block 2790 then terminates the process.

Optionally, the process includes an additional step, performed after the displaying step, of receiving input from a human annotator.

Figure 28:
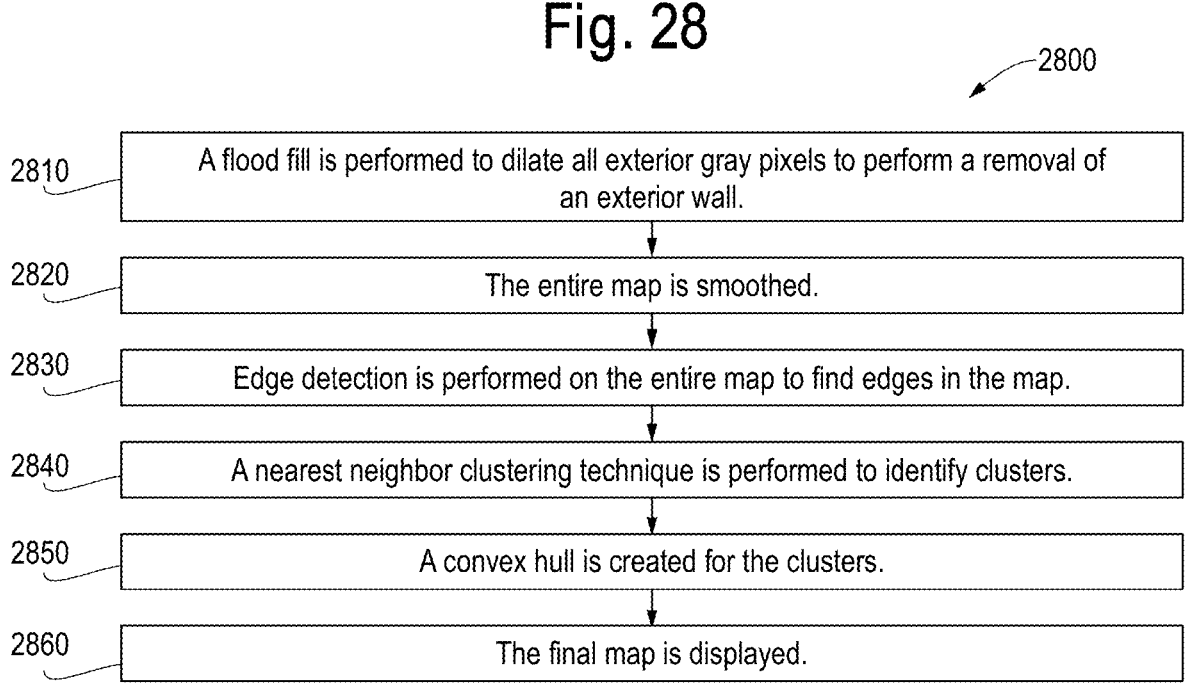
FIG. 28 is a flow chart of a second method for automatically annotating a robotic map.

FIG. 28 is a flow chart of a second method 2800 for automatically annotating a robotic map.

The order of the steps in the method 2800 is not constrained to that shown in FIG. 28 or described in the following discussion. Several of the steps could occur in a different order without affecting the final result.

In step 2810, a flood fill is performed to dilate all exterior gray pixels to perform a removal of an exterior wall. Block 2810 then transfers control to block 2820.

In step 2820, the entire map is smoothed. For example, the smoothing comprises Gaussian smoothing. Block 2820 then transfers control to block 2830.

In step 2830, edge detection is performed on the entire map to find edges in the map. Block 2830 then transfers control to block 2840.

In step 2840, a nearest neighbor clustering technique is performed to identify clusters. Block 2840 then transfers control to block 2850.

In step 2850, a convex hull is created for the clusters. Block 2850 then transfers control to block 2860.

In step 2860, the final map is displayed. Block 2860 then terminates the process.

Optionally, the process includes an additional step, performed after the displaying step, of creating an annotation of the final map.

Optionally, the process includes an additional step, performed after the displaying step, of receiving input from a human annotator.

For example, it will be understood by those skilled in the art that software used by the system and method for automatically annotating a map may be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

For example, embodiments of the invention could operate on a wide range of devices other than mobile phones, tablets, and computers without substantially affecting the functioning of embodiments of the invention.

An advantage of the method for automatic annotation of a map is that dangers not easily visible to existing sensors such as lasers can be automatically annotated, saving time and money and promoting robotic safety. A further advantage of the method is that the Gaussian smoothing helps eliminate noise and increases one or more of precision and accuracy of edge detection output.

It will be understood by those skilled in the art that software used by the method for automatic annotation of a map may be located in any location in which it may be accessed by the system. It will be further understood by those of skill in the art that the number of variations of the network, the location of the software, and the like are virtually limitless.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for automatically annotating a robotic map, comprising:
    performing a removal of an exterior wall in the robotic map by performing a flood fill to dilate pixels unobserved by a robot and disposed outside of the exterior wall;
    updating the robotic map by:
        smoothing the robotic map;
        performing edge detection on the robotic map to find edges in the map;
        performing a nearest neighbor clustering technique to identify clusters; and
        creating a convex hull for the clusters; and
    displaying the updated robotic map.

2. The method of claim 1, comprising a further step, performed after the displaying step, of creating an annotation of the updated robotic map.

3. The method of claim 1, comprising an additional step, performed after the displaying step, of receiving input from a human annotator.

4. The method of claim 1, wherein the smoothing step comprises Gaussian smoothing.

\* \* \* \* \*